United States Patent [19]

Hille et al.

[11] 4,456,707

[45] Jun. 26, 1984

[54] PROCESS FOR THE PRODUCTION OF FIBER-CONTAINING POLYURETHANE MOLDINGS HAVING INHOMOGENEOUSLY COLORED SURFACES

[75] Inventors: Lothar Hille, Leverkusen; Heimo Lüdke, Berg.-Gladbach; Nikolaus Hansjosten, Pluwig, all of Fed. Rep. of Germany

[73] Assignee: Bayer Aktiengesellschaft, Leverkusen, Fed. Rep. of Germany

[21] Appl. No.: 484,067

[22] Filed: Apr. 11, 1983

[30] Foreign Application Priority Data

Apr. 23, 1982 [DE] Fed. Rep. of Germany ....... 3215260

[51] Int. Cl.$^3$ .............................................. C08L 75/04
[52] U.S. Cl. .................................... 521/99; 521/102; 521/122; 521/137; 521/920; 523/171; 524/12; 524/34; 524/847; 524/871; 524/872; 524/873; 524/874; 524/875
[58] Field of Search .................. 521/99, 102, 109, 122, 521/137, 920; 523/171; 524/12, 34, 847, 871, 872, 873, 874, 875

[56] References Cited

U.S. PATENT DOCUMENTS

| | | | |
|---|---|---|---|
| 3,024,209 | 3/1962 | Ferrigno | 521/137 |
| 3,904,557 | 9/1975 | Guthrie et al. | 521/99 |
| 3,968,182 | 7/1976 | Inoue et al. | 260/858 |
| 4,102,831 | 7/1978 | Osgood | 521/99 |
| 4,137,215 | 1/1979 | Van Gasse | 260/40 R |
| 4,182,700 | 1/1980 | Benton et al. | 523/171 |
| 4,201,846 | 5/1980 | Kehr et al. | 521/137 |
| 4,368,277 | 1/1983 | Burinsky et al. | 521/84 |

FOREIGN PATENT DOCUMENTS 1298134 11/1972 United Kingdom .
1411958 10/1975 United Kingdom .

*Primary Examiner*—Maurice J. Welsh
*Attorney, Agent, or Firm*—Gene Harsh; Joseph C. Gil; Lyndanne M. Whalen

[57] ABSTRACT

Polyurethane moldings having an inhomogeneously colored surface with color contrasts in fiber-like distribution are made by incorporating colored fibers of a specified type in a polyurethane forming reaction mixture. The colored fibers must have a staple length of from 0.1 to 6 mm, a denier of from 0.1 to 25 dtex, and a coloring agent that does not migrate or dissolve in the polyurethane-forming materials. These fibers are generally used in a quantity such that they represent from 0.1 to 10 wt. % of the polyurethane-forming reaction mixture. Shoe soles, shoe heels, multiple layer soles and padded components are examples of moldings which may be produced in accordance with the present invention.

5 Claims, No Drawings

PROCESS FOR THE PRODUCTION OF FIBER-CONTAINING POLYURETHANE MOLDINGS HAVING INHOMOGENEOUSLY COLORED SURFACES

BACKGROUND OF THE INVENTION

This invention relates to fiber-containing, optionally cellular polyurethane moldings having inhomogeneously colored surfaces with color contrasts in fiber-like distribution and a process for their production.

It is known that moldings of cellular or non-cellular polyurethanes can be provided with a surface coloration by addition of pigments, dyes or both to the reaction components. It is also known that colored surfaces can be obtained by treatment of the moldings by immersion in dye baths, by spraying, by casting or by in-mold coating. One disadvantage common to these known processes is that addition of conventional coloring constituents to the liquid components gives a homogeneously colored surface which leaves the impression of a typical plastic surface. However, such a surface is not always desirable for articles such as fashionable shoe soles.

Inhomogeneously colored surfaces may also be obtained by color treatment after formation of the article (e.g., application of lacquers by spraying). However, this type of treatment involves greater expense and, in the case of integrally foamed shoe soles, for example, can only be applied after special measures (such as masking the upper part of the shoe by means of screens) have been taken. In addition, such application of lacquers results in a surface image which is being rejected to an increasing extent for reasons of fashion.

Fiber-filled polyurethane elastomers, particularly those based on chopped and ground glass fiber additions (see German Offenlegungsschrift No. 2,056,740), are also known. The fibers present in such elastomers are said to have reinforcing effects. The use of organic reinforcing fibers is described in German Offenlegungsschriften Nos. 2,220,306 and 2,164,381.

German Offenlegungsschrift No. 2,419,527 describes a process for producing decorative plastic moldings from molding compositions containing colored components. More specifically, polymer particles (for example, granulated polystyrene) which are at least partly soluble in the binder of the molding composition under molding conditions are mixed into the molding composition (for example, unsaturated polyesters containing glass fibers and/or asbestos fibers dissolved in styrene/diallyl phthalate monomers). In the disclosed process, the polymer particles differ in color from the molding composition and are processed under conditions (e.g., in the melt or by extrusion) such that the polymer particles dissolve to such a degree that a decorative effect is achieved. The particles mixed into the molding composition may be granular, flake-like or fiber-like depending upon the decorative function which they are intended to perform. The decorative effects achieved by this disclosed process are blurred color changes resembling natural stone.

SUMMARY OF THE INVENTION

It is an object of the present invention to provide a process for the production of a fiber-containing polyurethane molding having an attractive inhomogeneously colored surface with color contrasts in fiber-like distribution.

It is also an object of the present invention to provide a process for the production of a fiber-containing polyurethane molding having an attractive inhomogeneously colored surface in which no coloring treatment after the molding is formed is required.

It is another object of the present invention to provide a process for the production of a fiber-containing polyurethane molding having an attractive inhomogeneously colored surface in which the polyurethane-forming components may be processed with standard equipment without adversely affecting the mechanical properties of the molding.

It is yet another object of the present invention to provide a process for the production of a fiber-containing polyurethane molding having an attractive inhomogeneously colored surface in which it is unnecessary to take measures to prevent sinking or floating of the colored fiber flocks in the carrier medium.

These and other objects which will be apparent to those skilled in the art are accomplished by mixing colored fibers or fiber blends satisfying specific requirements with a starting component for the product polyurethane and subsequently reacting this fiber-containing component with the remaining polyurethane-forming components in a closed mold. The colored fibers and/or fiber blends employed should have an average length of from 0.1 to 6 mm and a denier of from 0.1 to 25 dtex. These fibers should also be made with coloring components which do not bleed out or dissolve in the starting materials from which the polyurethane is produced. The fibers are generally used in a quantity such that they form from 0.1 to 10 wt. % of the reaction mixture.

DETAILED DESCRIPTION OF THE INVENTION

Modishly attractive moldings of polyurethanes having inhomogeneously colored surfaces with color contrasts in fiber-like distribution can be obtained by addition of colored so-called fiber flock (short, chopped or otherwise size-reduced fibers) as coloring agent or an additional coloring constituent to the polyurethane-forming reaction components. The processing of the liquid reaction components is not adversely affected in any way. The required color surface effect is formed directly from the liquid reaction components during the polyurethane-forming reaction. No after-treatment for coloring purposes is necessary. The polyurethane reaction components may be processed in standard processing machines without adversely affecting the mechanical properties of the contrastingly colored moldings to any significant extent.

If the fiber flocks are suitably treated (for example, with Doroflocs (a product of Bayer AG, Leverkusen)), the process of the present invention may be carried out by incorporating and uniformly distributing the fiber flock in the polyurethane starting materials using conventional mixers (such as propeller stirrers, toothed-disc stirrers, turbine impellers) without difficulty. It has also been found that the colored fiber flocks do not have any tendency to sink or float in the carrier medium, therefore, no special measures need be taken during processing to prevent these problems.

The present invention relates to a process for the production of fiber-containing, optionally cellular polyurethane moldings (preferably polyurethane elastomer moldings) having inhomogeneously colored, modishly attractive surfaces with color contrasts in fiber-like distribution. These moldings are produced by reacting known mixtures to form optionally cellular polyurethane moldings (preferably in closed molds). The colored fibers or fiber blends used should have a staple length of from 0.1 to 6 mm (preferably from 0.4 to 3 mm), and a denier of from 0.1 to 25 dtex, preferably from 1 to 20 dtex and, most preferably, from 1.3 to 17 dtex. The coloring components of these fibers or fiber blends should not bleed out or dissolve in the starting components used to produce the polyurethanes. The colored fibers or fiber blends are added to and mixed with one or more of the starting components or a portion of the starting component(s) in quantities of from 0.1 to 10 wt. %, preferably in quantities of from 0.15 to 3 wt. % and, most preferably, in quantities of from 0.2 to 2 wt. % (based on the fiber-containing reaction mixture).

The present invention also relates to moldings (particularly shoe soles), based on non-cellular or cellular polyurethanes having a density of from 350 kg/m$^3$ up to the density of the unexpanded polyurethane elastomer (optionally containing fillers and other additives besides the colored fibers), preferably having a density of $\geq$450 kg/m$^3$. These moldings have an inhomogeneously colored surface with color contrasts in fiber-like distribution and contain colored fibers or fiber blends having a staple length of from 0.1 to 6 mm (preferably from 0.4 to 3 mm) and a denier of from 0.1 to 25 dtex (preferably from 1.0 to 20 dtex and, most preferably, from 1.3 to 17 dtex). The coloring components present do not bleed out and are not dissolved in the polyurethane. The coloring fibers are present in quantities of from 0.1 to 10 wt. %, preferably from 0.15 to 3 wt. % and, most preferably, from 0.2 to 2 wt. % (based on the polyurethane).

The process according to the invention may be carried out by any of the various techniques known to those in the art. The colored fibers are preferably added to the component of the polyurethane-forming mixtures containing polyhydroxyl compounds. However, these fibers may also be added to only part of the polyhydroxyl compounds. The fibers may also be added to the polyisocyanate-containing component or to any other component, such as a chain-extending agent. In cases where the polyurethane is produced from an NCO-prepolymer, the fibers may be added to the NCO-prepolymer.

It is also possible to introduce the fibers as an additional component into the mixing vessel or into the mixing chamber during the actual mixing of the reaction components. In this case it is possible to use one or more concentrates of fiber in, for example, relatively small quantities of the polyhydroxyl compounds. This latter alternative makes it possible to introduce different or differently colored fiber flocks into the polyurethane-forming compositions in a manner which yields special color effects in the end product.

The colored fibers used in accordance with the present invention are preferably natural or synthetic colored fibers which contrast in color with the polyurethane supporting material which is usually uncolored, although it may be colored.

The nature of the resulting inhomogeneously colored surfaces of the polyurethane molding colored to produce an "enlivening" mottled effect also depends upon the type, shape, thickness and length of the fibers used.

The largest dimensions of the colored fibers suitable for a particular application are primarily dependent upon the machines and mixers and/or conveyors used in the production of the moldings. It has been found that, if the fibers are too small, the surface of the molding is either less rich in contrast or homogeneous in color. In order to obtain the required surface impression, it is necessary to use colored fibers having a staple length of from 0.1 to 6 mm and preferably from 0.4 to 3 mm. In cases where the fibers are ground or fibrillated, blends having a maximum fiber length of 6 mm are used.

In accordance with the invention, the denier of the fibers used is in the range from 0.1 to 25 dtex, preferably from 1.0 to 20 dtex and, most preferably, from 1.3 to 17 dtex. The surface impression of the molding also depends upon the quantity of fibers added. In the present invention, the fibers are added in quantities of from 0.1 to 10 wt. %, preferably from 0.15 to 3 wt. % and, most preferably, from 0.2 to 2 wt. % (based on the polyurethane-forming reaction mixture as a whole, including all additives). The colored fibers may also be used in the form of blends of fibers differing in their chemical structure, their cross-sections, their denier, their length and, optionally, their thickness over the length of the fiber. It is also possible to use blends of differently colored fibers and to obtain color effects by varying color mixes. Colored fibers of the type known as flock fibers for flocking surfaces are particularly suitable.

In the practice of the present invention, any fibrous natural products in colored (dyed) form may be used as natural fiber material. Examples of such fibrous natural products include fibers of cotton, wool, flax, hemp, jute, bast, palm fibers, sisal and others, which may be colored with dyes that are rich in contrast to the polyurethane.

Suitable synthetic fibers are any fibers of man-made materials which satisfy the requirements of the present invention. Thus, it is possible to use fibers of modified natural materials such as viscose, or of man-made materials such as synthetic fibers of polyamide, polyacrylonitrile, polyester, aramide, elasthane, modacrylic, polyvinyl chloride, polyvinylidene chloride, polyolefins and/or various copolymers which may be converted into fiber form. However, it is preferred to use standard commercial fiber flocks of polyamide, viscose, polyacrylonitrile or polyester.

In order to obtain the desired color contrast in the surface of the molding, it is necessary to use pigments or dyes which do not migrate (bleed) after the colored fiber flocks have been incorporated by mixing into the carrier medium (preferably the polyhydroxyl compounds). In this regard, basic dyes such as Astrazon ® dyes, have proven to be suitable for polyacrylonitrile fibers. Acid dyes are particularly suitable for polyamide fibers. Reactive dyes are useful when cellulose and viscose fibers are used. Colored fibers containing inorganic pigments or substantially insoluble organic pigments as coloring agents are generally resistant to bleeding. The fibers must be colored beyond their own natural color and differ from the polyurethane composition in their depth of color for the desired surface effect to be achieved. Therefore, quantities of more than 0.4 wt. % of dye or colored pigment, preferably more than 0.75 wt. % and, most preferably, more than 1 wt. % of dye or colored pigment (based on the weight of the fibers) are generally used to color the fiber. Fibers containing fluorescent dyes, daylight dyes, colored opalescing additives (mother-of-pearl-like additives) and other coloring additives may also be used for special effects. The fibers themselves may be produced by dry or wet spinning processes, by coagulation processes, by fibrillation or electrostatic spraying or by mechanical size reduction, such as cutting, splitting, grinding, fibrillation. It is also possible to use multicomponent fibers, bifiller fibers with a tendency towards crimping, textured filaments or chopped-ribbon-like filaments. The fibers are generally surface-treated with standard preparations or other surface-modifying agents in such a way that they may be readily distributed in the polyurethane-forming starting materials. Particularly suitable fibers of this type are the commercial "flock fibers" available for flocking purposes.

Instead of using natural or synthetic fibers, it is also possible to use glass fibers (silicate fibers) spun from colored glass melts. However, these fibers are not recommended for most applications because suitable colored glass fibers can be produced only in a limited number of shades by methods which are both technologically and economically impractical.

In the present invention, the colored fibers must show adequate migration resistance of the dye used. Migration behavior may be tested by storing the mixture of colored fibers and the reaction component serving as carrier at a temperature corresponding to the processing temperature of that component (at 50° C., for example, in the case of a polyester polyol/fiber mixture). The duration of this test must equal the period for which the mixture of that reaction component and fiber flock is stored in practice (at least two hours), preferably 24 hours. Only those colored fibers which dissolve partially, if at all, in the reaction components or during the polyurethane-forming reaction should be used in the present invention.

Examples of moldings which may be produced in accordance with the present invention are shoe soles, shoe heels, shoe legs, outsoles foamed on in a single operation, multiple-layer soles, elastic rubber-like buffers, buckets, safety screens, padded components for motor vehicles, mats, surfboard covers, protective caps, cushions, covers, housings, parts of furniture, casings and chair moldings.

The moldings produced in accordance with the present invention are flexible, semi-rigid or rigid, preferably semi-rigid and preferably cellular polyurethane having an impervious outer skin. These moldings may be produced by reacting mixtures which form molded polyurethane plastics in closed molds using the "overcharging" technique known to those in the art. In this process, the quantity of reaction mixture introduced in the mold is measured in such a way that the average density of the product molding is higher than that of a corresponding, free-foamed foam (i.e., a foam obtained, for example, in an open mold). By suitably selecting the type and quantity of starting materials, auxiliaries and additives used and by controlling the temperature of the mold in known manner, it is possible to obtain a variety of molded foams having a more or less thick outer skin and, optionally, an integral distribution of density or solid molded plastics if no blowing agent is used. Similarly, the hardness of the moldings produced in accordance with the present invention may be regulated in known manner by selection of the type and quantity of starting materials used. The chemical nature of the starting materials and also the composition of the formulations is not crucial to the invention and may be found in the relevant literature (see, for example, "Integralschaumstoffe (Integral Foams)" by Piechota/Rohr, Carl Hanser Verlag, Munich/Vienna, pages 14–23 or Kunststoff-Handbuch, Vol. VII, "Polyurethane (Polyurethanes)" by Vieweg/Hochtlen, Carl Hanser Verlag, Munich).

In the process of the present invention, the reaction mixtures are preferably processed in a single stage using known two-component mixing units. Such units are described in the literature (see, for example, "Integralschaumstoffe" by Piechota/Rohr, pages 26–56 or "Wirtschaftliches Herstellen von PUR-formteilen (Economic Production of PUR-mouldings)", VDI-Verlag, Dusseldorf (1981), pages 123–136). However, the process of the present invention may also be carried out using prepolymers. More specifically, the moldings may be made from NCO-prepolymers which were produced in advance and suitable chain-extending agents, optionally with the usual auxiliaries and additives.

The moldings of the present invention are preferably semi-rigid polyurethane elastomers having an impervious outer skin and a preferably cellular core made from known polyurethane-forming materials in accordance with techniques known to those skilled in the art.

The density of the elastomers produced in accordance with the present invention is at least 350 kg/m$^3$ and preferably at least 450 kg/m$^3$. In the case of substantially or completely nonfoamed moldings (optionally containing mineral fillers), the density may be as high as 1400 kg/m$^3$, but is preferably about 1200 kg/m$^3$.

Having thus described our invention, the following Examples are given by way of illustration.

EXAMPLES

The production of polyurethane shoe soles in accordance with the present invention is described in Examples 1 and 2 below. An aluminum mold tempered to 40° C. was used for this purpose. The quantity of foamable mixture was measured in such a way that the moldings obtained had a gross density of 500 kg/m$^3$. The reaction components were processed in a DESMA low-pressure machine (Injection Unit PSA 70 of DESMA-Industrial Machines Inc., North Woburn Industrial Center Woburn, Mass. 01801/USA) specially designed for the production of polyurethane shoe soles. The reaction components were transported and metered by means of gear pumps. The mixing of the reaction components was carried out in a high-speed mixing screw.

EXAMPLE 1

The polyol component used was as follows:

| | |
|---|---|
| Polyester diol, OH-number 56, based on adipic acid, ethylene glycol and diethylene glycol (ratio by weight 50:50) | 90.0 parts by weight |
| 1,4-butane diol | 12.0 parts by weight |
| Triethylene diamine | 0.6 part by weight |
| Water | 0.4 part by weight |
| Standard commercial polysiloxane stabilizer (Dow Corning Oil 193 of Dow Corning International Ltd. | 1.0 part by weight |
| Pigment paste (beige) (Moltopren ®-Color Paste of Bayer AG, Leverkusen, Germany) | 0.7 part by weight |
| Fiber flock (polyacrylonitrile fibers having a denier of 1.3 dtex and a staple length of 0.9 mm and dyed dark brown using a non-migrating Astrazon ® dye) | 1.0 part by weight |

The polyisocyanate component was a semi-prepolymer (NCO-content 20 wt. %) produced by reacting 4,4'-diisocyanato diphenylmethane with the above-mentioned polyester diol.

The polyol and polyisocyanate components were processed in the manner described above with the NCO-index maintained at 100.

After a residence time in the mold of 4 minutes, a flexible shoe sole having an inhomogeneously colored surface was obtained. The colored surface effect was comparable to fine mottling. The individual fibers were invisible to the naked eye.

EXAMPLE 2

The polyol component was made up of:

| | |
|---|---|
| A polyether diol (OH-number 28) produced by the propoxylation of propylene glycol, followed by the addition of ethylene oxide | 90.0 parts by weight |
| 1,4-butane diol | 10.0 parts by weight |
| Triethylene diamine | 0.40 part by weight |
| Dibutyl tin dilaurate | 0.02 part by weight |
| Monofluorotrichloromethane | 6.00 parts by weight |
| Pigment paste (white) (Moltopren ®-Color Paste of Bayer AG, Leverkusen, Germany | 1.50 parts by weight |
| Fiber flock (polyacrylonitrile fibers having a denier of 17 dtex and a staple length of 1 mm and colored blue with a non-migrating Astrazon ® dye) | 0.70 part by weight |

The polyisocyanate component was a reaction product of 4,4'-diisocyanato diphenylmethane with an equimolar mixture of di- and tripropylene glycol. The reaction product had an NCO-content of 24 wt. %.

The polyol and polyisocyanate components were processed in the manner described above with the NCO-index maintained at 100.

After a residence time in the mold of 4 minutes, a shoe sole having an inhomogeneously colored surface was obtained.

EXAMPLE 3

The polyol component was made up of:

| | |
|---|---|
| Same polyester diol as was used in Example 1 | 90.0 parts by weight |
| 1,6-hexane diol | 6.0 parts by weight |
| Triethylene diamine | 0.5 part by weight |
| Fiber flock (polyamide fibers having a denier of 1.6 dtex and a staple length of 0.8 mm and colored black with a non-migrating acid dye) (Telon ®-dye of Bayer AG, Leverkusen, Germany) | 0.70 part by weight |

The polyisocyanate component corresponded to the polyisocyanate component of Example 1.

The polyol and polyisocyanate components were mixed with one another in equimolar quantities and introduced into an aluminum mold measuring 200×200×10 mm and then tempered to 40° C. After a residence time in the mold of 3 minutes, a flexible, solid, (i.e., non-foamed) molding having an inhomogeneously colored surface was obtained.

EXAMPLE 4

The polyol component was made up of:

| | |
|---|---|
| Propoxylated trimethylol propane (OH-number 550) | 70.0 parts by weight |
| Phthalic acid/trimethylol propane polyester polyol (OH-number 350) | 20.0 parts by weight |
| Standard commercial polysiloxane stabilizer (Stabilizer OS 710 of Bayer AG, Leverkusen, Germany) | 3.0 parts by weight |
| Permethylated diethylene triamine | 0.2 part by weight |
| Monofluorotrichloromethane | 6.0 parts by weight |
| Fiber flock (polyacrylonitrile fibers having a denier of 3.3 dtex and a staple length of 1 mm and colored red using an Astrazon ® dye) | 1.5 parts by weight |

The polyisocyanate component was a carbodiimide-modified 4,4'-diisocyanato diphenylmethane having an NCO-content of 30%.

Using the mold described in Example 3, a mixture of the polyol and polyisocyanate components was processed to form a molded foam with the NCO-index maintained at 100. The quantity of foamable mixture was such that the molding obtained had a gross density of 500 kg/m$^3$. After a residence time in the mold of five minutes, a rigid polyurethane foam molding having an inhomogeneously colored surface was obtained.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a fiber-containing polyurethane molding which has an attractive inhomogeneously colored surface with color contrasts in fiber-like distribution comprising:
    (a) mixing with at least one starting component for the production of polyurethane colored fibers or fiber blends having a staple length of from 0.1 to 6 mm and a denier of from 0.1 to 25 dtex which fibers have coloring components that do not bleed out or dissolve in the starting materials from which the polyurethane is made in a quantity such that the fibers are from 0.1 to 10 wt. % of the fiber-containing reaction mixture; and
    (b) reacting the starting component for the production of polyurethane of (a) into which the fibers have been mixed with the necessary remaining polyurethane-forming component in a closed mold.
2. The process of claim 1 wherein the fiber-containing polyurethane molding is a cellular polyurethane.
3. The process of claim 1 wherein the colored fibers or fiber blends are mixed with a polyol component in step (a).
4. A fiber-containing polyurethane molding having an attractive inhomogeneously colored surface with color contrasts in fiber-like distribution containing from 0.1 to 10 wt. % (based on polyurethane) colored fibers or fiber blends which fibers have a staple length of from 0.1 to 6 mm, a denier of from 0.1 to 25 dtex and a coloring component which does not bleed or dissolve in the starting materials from which the polyurethane is produced.
5. The molding of claim 4 having a density which is greater than or equal to 350 kg/m$^3$.

* * * * *